(12) United States Patent
Svensson

(10) Patent No.: US 11,702,844 B2
(45) Date of Patent: Jul. 18, 2023

(54) BUILDING PANELS COMPRISING A LOCKING DEVICE

(71) Applicant: Välinge Innovation AB, Viken (SE)

(72) Inventor: Johan Svensson, Kattarp (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/337,699

(22) Filed: Jun. 3, 2021

(65) Prior Publication Data
US 2021/0381251 A1 Dec. 9, 2021

(30) Foreign Application Priority Data

Jun. 5, 2020 (SE) .................................. 2050661-4

(51) Int. Cl.
*E04F 13/08* (2006.01)
*A47B 96/20* (2006.01)
(Continued)

(52) U.S. Cl.
CPC ........ *E04F 13/0894* (2013.01); *A47B 96/201* (2013.01); *A47K 3/283* (2013.01);
(Continued)

(58) Field of Classification Search
CPC . E04F 13/0894; E04F 13/18; E04F 15/02038; E04F 15/02188;
(Continued)

(56) References Cited

U.S. PATENT DOCUMENTS 448,733 A * 3/1891 Sagendorph ........ E04F 13/0894
52/526
8,887,468 B2 11/2014 Håkansson et al.
(Continued)

FOREIGN PATENT DOCUMENTS

WO WO 2006/104436 A1 10/2006
WO WO-2013151494 A1 * 10/2013 ............... E04B 1/54
(Continued)

OTHER PUBLICATIONS

U.S. Appl. No. 17/717,359, Darko Pervan, filed Apr. 11, 2022.
(Continued)

*Primary Examiner* — Brent W Herring
(74) *Attorney, Agent, or Firm* — Buchanan Ingersoll & Rooney P.C.

(57) ABSTRACT

Building panels including a first and a second panel and including a locking device. The locking device includes a tongue and an edge groove provided in the second panel and the first panel, respectively, wherein the tongue and the edge groove are configured to cooperate with each other for locking a first edge portion of the first panel to a second edge portion of the second panel in a first direction. The locking device further includes a separate tongue provided in an insertion groove and a tongue groove configured to cooperate with each other for locking the first edge portion to the second edge portion in a second direction. A length of the tongue groove along an edge portion may be smaller than a length of the edge portion. A length of the insertion groove along an edge portion may be smaller than the length of the edge portion.

16 Claims, 5 Drawing Sheets

(51) Int. Cl.
    *E04F 13/18*     (2006.01)
    *E04F 15/02*     (2006.01)
    *A47K 3/28*     (2006.01)

(52) U.S. Cl.
    CPC ......... *E04F 13/18* (2013.01); *E04F 15/02038* (2013.01); *E04F 15/02188* (2013.01); *E04F 2201/0115* (2013.01); *E04F 2201/023* (2013.01); *E04F 2201/043* (2013.01); *E04F 2201/0535* (2013.01)

(58) Field of Classification Search
    CPC ......... E04F 2201/0115; E04F 2201/023; E04F 2201/043; E04F 2201/0535; E04F 2201/0547; A47B 96/201; A47B 47/042; A47K 3/283; F16B 5/0016; F16B 5/0084; F16B 12/125; F16B 2012/466
    USPC .................. 52/588.1, 582.1, 591.1, 578
    See application file for complete search history.

(56) References Cited

U.S. PATENT DOCUMENTS

| | | | |
|---|---|---|---|
| 9,216,541 B2* | 12/2015 | Boo | E04C 2/02 |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brannstrom et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 2006/0101769 A1* | 5/2006 | Pervan | F16B 5/0004 52/591.1 |
| 2008/0134614 A1* | 6/2008 | Pervan | E04F 15/02038 52/588.1 |
| 2009/0049787 A1* | 2/2009 | Hannig | E04F 15/107 52/589.1 |
| 2010/0043333 A1* | 2/2010 | Hannig | F16B 5/0056 52/582.2 |
| 2010/0083603 A1* | 4/2010 | Goodwin | E04F 15/02 52/792.11 |
| 2010/0218450 A1* | 9/2010 | Braun | F16B 5/0056 52/745.21 |
| 2011/0030303 A1 | 2/2011 | Pervan et al. | |
| 2011/0167750 A1* | 7/2011 | Pervan | E04F 15/02038 52/582.2 |
| 2012/0279161 A1 | 11/2012 | Håkansson et al. | |
| 2013/0019555 A1* | 1/2013 | Pervan | E04F 15/02038 52/588.1 |
| 2013/0042562 A1* | 2/2013 | Pervan | E04F 13/0894 52/582.2 |
| 2013/0042564 A1* | 2/2013 | Pervan | E04F 15/02038 52/582.2 |
| 2013/0047536 A1* | 2/2013 | Pervan | E04F 15/18 52/309.1 |
| 2013/0263547 A1* | 10/2013 | Boo | E04C 2/38 52/588.1 |
| 2015/0000221 A1* | 1/2015 | Boo | E04F 15/02038 52/588.1 |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0300029 A1* | 10/2015 | Pervan | E04F 15/02038 52/582.2 |
| 2015/0330088 A1 | 11/2015 | Derelöv | |
| 2016/0007751 A1 | 1/2016 | Derelöv | |
| 2016/0174704 A1 | 6/2016 | Boo et al. | |
| 2016/0251859 A1* | 9/2016 | Pervan | E04F 15/02038 52/582.2 |
| 2016/0270531 A1 | 9/2016 | Derelöv | |
| 2016/0281368 A1 | 9/2016 | Pervan et al. | |
| 2016/0340913 A1* | 11/2016 | Derelov | A47B 47/00 |
| 2017/0037640 A1* | 2/2017 | Boucké | E04F 15/107 |
| 2017/0079433 A1 | 3/2017 | Derelöv et al. | |
| 2017/0089379 A1* | 3/2017 | Pervan | F16B 12/46 |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0328072 A1* | 11/2017 | Hannig | E04F 15/04 |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2018/0355619 A1* | 12/2018 | Neuman | E04F 15/102 |
| 2019/0024387 A1 | 1/2019 | Pervan | |
| 2019/0113061 A1 | 4/2019 | Håkansson et al. | |
| 2019/0166963 A1 | 6/2019 | Boo et al. | |
| 2019/0191870 A1 | 6/2019 | Derelöv | |
| 2019/0195256 A1 | 6/2019 | Derelöv | |
| 2019/0211568 A1* | 7/2019 | Nilsson | E04F 15/0215 |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0181923 A1* | 6/2020 | Quist | E04F 15/02005 |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |

(56) References Cited

U.S. PATENT DOCUMENTS

| | | |
|---|---|---|
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2022/0018373 A1 | 1/2022 | Boo |

FOREIGN PATENT DOCUMENTS

| | | | |
|---|---|---|---|
| WO | WO 2015/105449 A1 | 7/2015 | |
| WO | WO 2015/171068 A1 | 11/2015 | |
| WO | WO-2016114712 A1 * | 7/2016 | ........ E04F 15/02038 |

OTHER PUBLICATIONS

Pervan, Darko, U.S. Appl. No. 17/717,359 entitled "Mechanical Locking System for Building Panels," filed in the U.S. Patent and Trademark Office filed Apr. 11, 2022.
U.S. Appl. No. 17/588,698, Caroline Landgård, Marcus Ståhl and Darko Pervan, filed Jan. 31, 2022.
International Search Report/Written Opinion dated Jul. 30, 2021 in PCT/SE2021/050521, ISA/SE Patent-och registreringsverket, Stockholm, SE, 11 pages.
Office Action/Search Report issued in SE Patent Application No. 2050661-4, dated Feb. 1, 2021, PRV, Stockholm, SE, 8 pages.
Landgård, Caroline, et al., U.S. Appl. No. 17/588,698, entitled "Building Panels Comprising a Locking Device," filed in the U.S. Patent and Trademark Office filed Jan. 31, 2022.

* cited by examiner

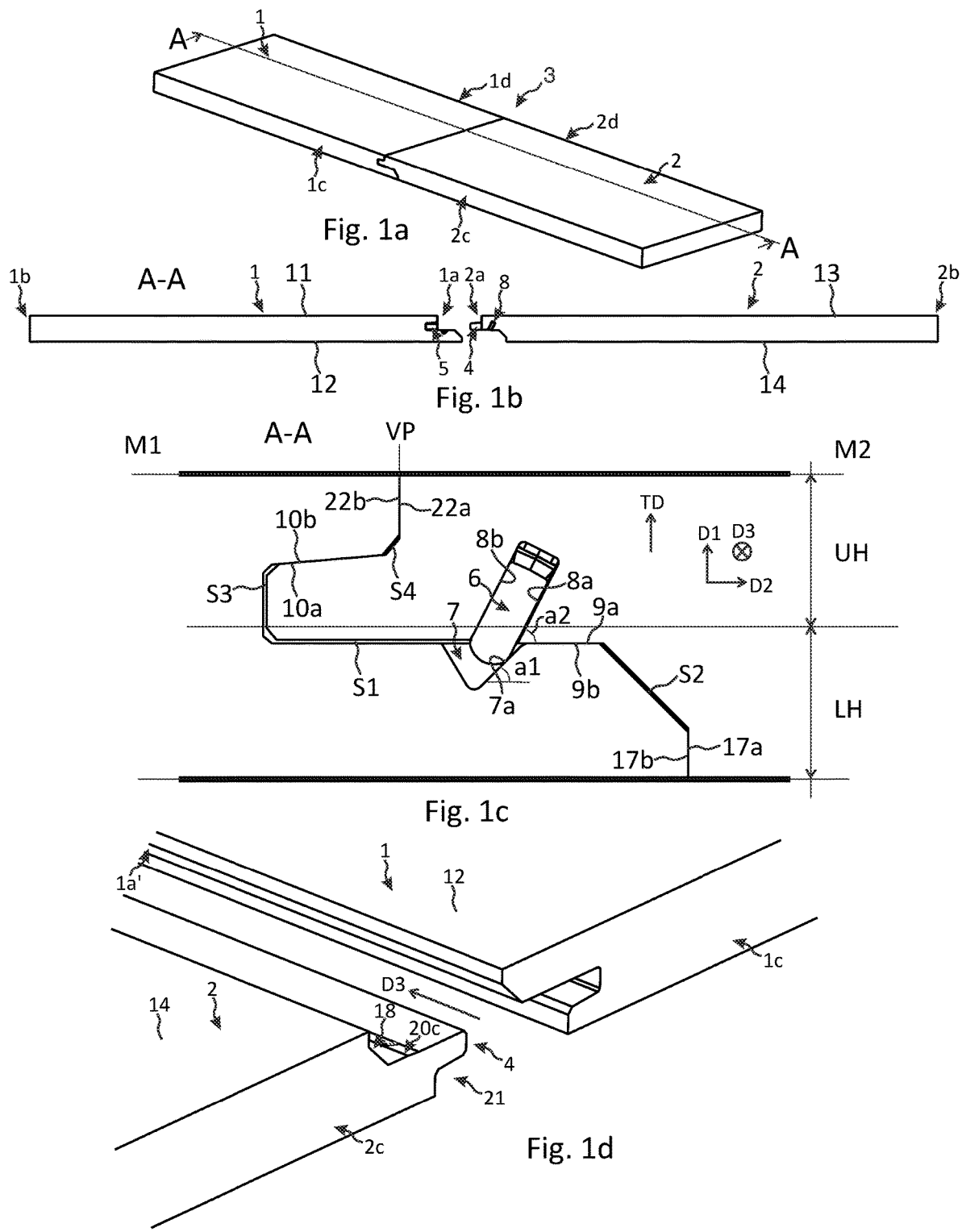

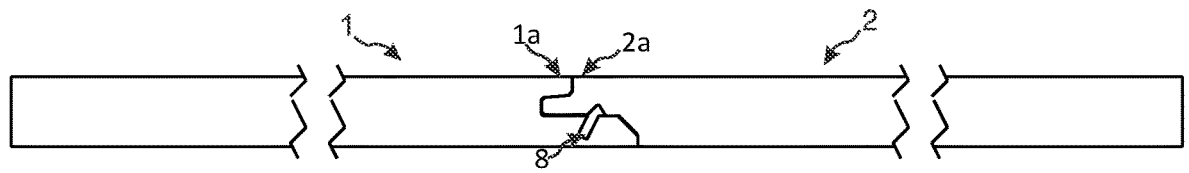
Fig. 5a
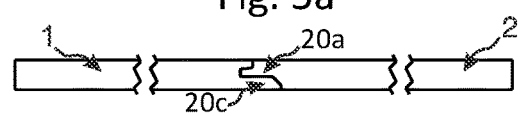
Fig. 5b
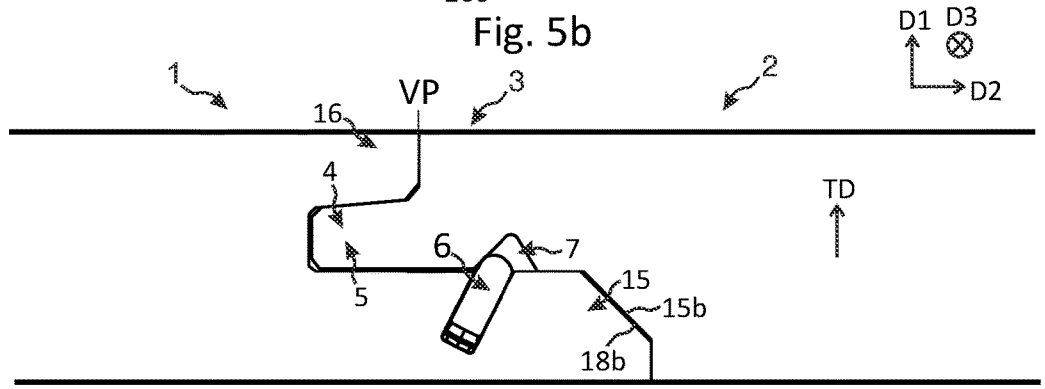
Fig. 5c
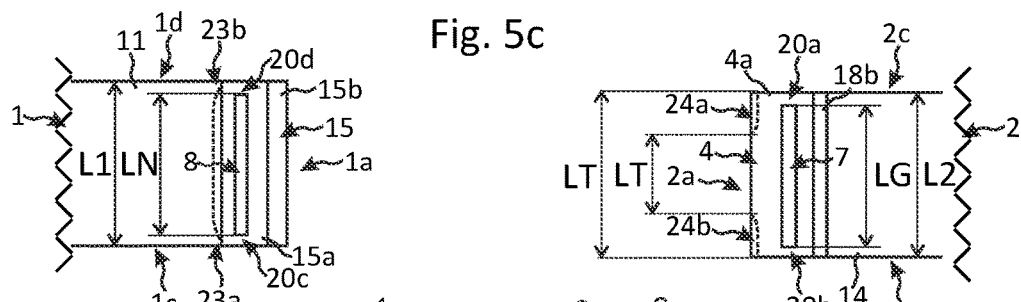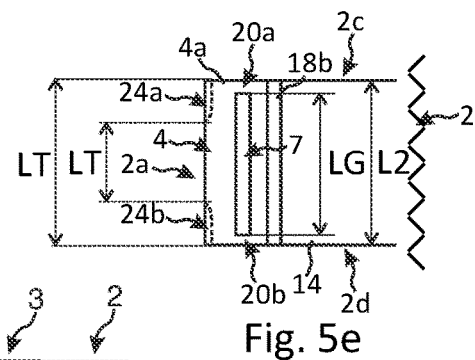
Fig. 5d      Fig. 5e
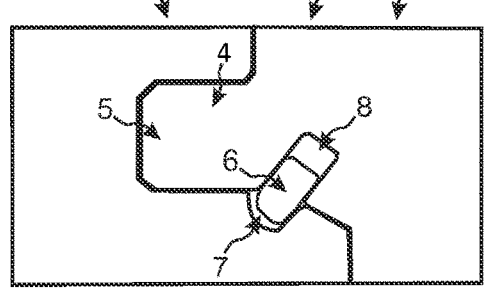
Fig. 5f
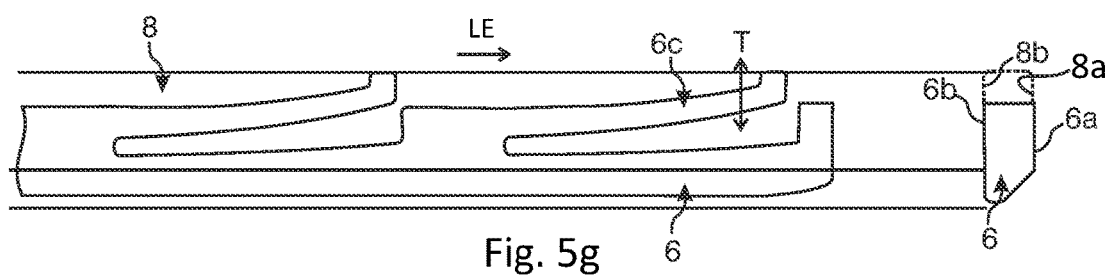
Fig. 5g

BUILDING PANELS COMPRISING A LOCKING DEVICE

CROSS REFERENCE TO RELATED APPLICATIONS

The present application claims the benefit of Swedish Application No. 2050661-4, filed on Jun. 5, 2020. The entire contents of Swedish Application No. 2050661-4 are hereby incorporated herein by reference in their entirety.

TECHNICAL FIELD

The disclosure generally relates to building panels, such as furniture components, wall components or cubicle components, comprising a locking device, preferably a mechanical locking device. Preferably, the panels are configured to be arranged in parallel with each other in a locked state.

BACKGROUND

WO 2015/171068 A1 discloses mechanically connectable panels, for example furniture components, configured to be arranged essentially in parallel with each other. A separate and flexible tongue is insertable into a tongue groove for connecting the panels to each other in a first direction and a panel edge of a panel is configured to cooperate with a core groove of an adjacent panel for connecting the panels to each other in a second direction.

Advantages of this type of panels are that they may be easy to assemble and to disassemble. Moreover, a strong mechanical locking system may be provided.

Despite these and many other advantages of this type of panels and associated locking systems, however, there is still room for improvements, such as improvements of certain details of the locking system. Furthermore, a more versatile range of uses of parallel panels comprising a mechanical locking system is needed.

SUMMARY

It is therefore an object of at least embodiments of the present inventive concept to provide building panels having an improved seal, the panels preferably being configured to be arranged in parallel with each other in a locked state.

Another object is to provide panels comprising a locking device which is more protected against environmental influences from the area in which the panels are installed, such as those resulting from a wet area.

Yet another object is to provide panels comprising a locking device having an improved design.

These and other objects and advantages that will be apparent from the description have been achieved by the various aspects, embodiments and examples described below.

In accordance with the inventive concept, there is provided building panels comprising a first panel and a second panel and comprising a locking device. The locking device comprises a tongue and an edge groove provided in the second panel and the first panel, respectively, wherein the tongue and the edge groove are configured to cooperate, preferably engage, with each other for locking a first edge portion of the first panel to a second edge portion of the second panel in a first direction. The locking device further comprises a separate, preferably flexible, tongue and a tongue groove configured to cooperate, preferably engage, with each other for locking the first edge portion to the second edge portion in a second direction, wherein the separate tongue is provided in an insertion groove.

A length of the tongue groove along the first or second edge portion is smaller than a length of the first or second edge portion, respectively.

Alternatively, or additionally, a length of the insertion groove along the second or first edge portion is smaller than the length of the second or first edge portion, respectively.

In accordance with the inventive concept, the tongue groove and/or the insertion groove may be provided at least partially, such as entirely, inside the first and/or the second edge portion(s), such as being delimited by one or two wall portion(s) and/or one or two barrier portion(s). Thereby, an improved seal may be provided along one or two side edge portion(s) of the panels. As a consequence, the locking device may become more protected. Moreover, the panels may become more aesthetically pleasing, since the tongue groove and/or the insertion groove may be at least partially concealed.

In addition to an edge portion, each panel may comprise an opposite edge portion and a pair of opposite side edge portions. Each panel may further comprise a first and a second surface portion, one or both of which may be visible in an installed state of the panels.

The length of the first or the second edge portion may be a length, preferably a longitudinal length, along the first or second edge portion, respectively.

The length of the first or second edge portion may be a length between two opposite side edge portions of the first or second panel, respectively, preferably at or adjacent to an outermost portion of the first or second edge portion, respectively. The outermost portion may be an outermost portion along the second direction.

The first direction may be a direction which is essentially perpendicular to a main plane provided along the first surface portion of the first panel and/or to a main plane provided along the second surface portion of the second panel. The second direction may be essentially parallel with the first and/or the second surface portion(s) of the first and/or the second panel(s). A third direction may be perpendicular to both the first and second directions. Preferably, the first, second and third directions refer to directions specified in a locked state of the first and second panels.

The building panels, or panels for short, may be essentially identical. Moreover, the panels may be rectangular, thereby comprising a pair of long side edge portions and short edge portions or a pair of short side edge portions and long edge portions. In some embodiments, the panels may be square.

The first panel may comprise a first and a second lip, wherein the first lip preferably extends beyond the second lip along the second direction. The edge groove may be provided between the first and second lips, such as along the first direction.

The tongue groove may be provided in the first lip, such as in an inner lip wall thereof. Preferably, the tongue groove is provided horizontally outside of a vertical plane provided between first joining portions of the first and second panels.

Generally herein, cooperating elements, such as between portions of the tongue and the edge groove or between portions of the first or the second lip and the second edge portion (joining portions, engagement portions, etc.), may cooperate by direct engagement or indirectly. In any embodiment described herein, there may be a sealing agent, such as a wax, silicone, a rubber strip or an adhesive, provided between the cooperating elements, thereby providing examples of an indirect engagement.

The tongue and the edge groove may be provided in the second edge portion and the first edge portion, respectively.

The tongue groove may be delimited by a first and/or a second wall portion along a longitudinal direction of the tongue groove. Alternatively, or additionally, the insertion groove may be delimited by a first and/or a second barrier portion along a longitudinal direction of the insertion groove. The longitudinal direction(s) may be parallel to the third direction introduced above.

The insertion groove and the tongue groove may be provided in the second edge portion and the first edge portion, respectively. Thereby, the separate tongue may be provided in the second panel.

In some embodiments, however, the insertion groove and the tongue groove may be provided in the first panel and the second panel, respectively. Other features, examples and characteristics of such panels and locking devices may be the same as when the insertion groove and the tongue groove described herein are provided in the second panel and the first panel, respectively, whereby reference is made thereto.

The length of the tongue groove may be smaller than a length of the tongue along the second edge portion. For example, the tongue may extend along the entire second edge portion.

The length of the tongue groove may be larger than a length of the tongue along the second edge portion. For example, the tongue may extend along a portion of the second edge portion.

In some embodiments, the tongue and/or the edge groove may be provided along the entire second and/or first edge portion(s).

In some embodiments, the tongue and/or the edge groove may be provided along a portion of the second and/or first edge portion(s). The edge groove may be delimited by a first and/or a second peripheral wall portion along the longitudinal direction of the edge groove.

The panels, such as the first and second panels, may be configured to be arranged in parallel with each other in a locked state of the first and second panels. Preferably, the first and second panels are configured to be locked by a relative displacement with respect to each other while main planes of the first and second panels are essentially provided in parallel. For example, an angle between the main planes may be less than 10°, such as less than 5°.

The tongue groove and/or the insertion groove may be slanted relative a main plane of the first panel and/or the second panel.

In a locked state of the first and second panels, there may be a space between the tongue and the edge groove, such as between a first tongue wall of the tongue and a first groove wall of the edge groove, and/or there may be a space between a first lip of the first panel and the second panel, such as a first recess of the second panel. For example, there may be a space between an intermediate lip wall and an intermediate recess wall.

The locking device preferably is a mechanical locking device.

The locking device may further comprise first engagement portions and/or second engagement portions for locking along the first direction. For example, the first engagement portions may be disposed outside of the tongue groove along the second direction.

The locking device may further comprise first joining portions and/or second joining portions for locking along the second direction.

The building panels may be furniture components, wall components or cubicle components, such as components for a shower cubicle.

The panels may be polymer-based panels, such as comprising a thermoplastic material or a thermosetting resin. For example, the panels may be Luxury Vinyl Tiles (LVT), so-called Stone Plastic (Polymer) Composite (SPC) panels, acrylic panels or epoxy panels.

The panels may comprise or may be entirely composed of a hard material, such as a mineral material or a metal. In a first example, the panels may comprise a Solid Surface material. In a second example, the panels may comprise stone-based material or may be ceramic slabs or aluminium slabs.

The panels may comprise wood fibres. For example, the panels may comprise solid wood, such as hardwood. In some embodiments, the panels may comprise wood fibres and a binder, such as a thermosetting resin. For example, the panels may be High Pressure Laminate (HPL) panels.

Generally herein, the panels may comprise at least one decorative layer and/or at least one protective layer, such as a wear layer, lacquer or wax. For example, the first and/or the second surface portion(s) may comprise a decorative layer and, optionally, a protective layer.

In some embodiments, the building panels may be adapted to be installed in a wet area, such as a bathroom, a lavatory or a shower room. For example, the panels may be water resistant.

The separate tongue may comprise a polymer material and, preferably, a reinforcement, such as glass fibres. Moreover, the separate tongue may be formed by injection moulding.

Aspects of the inventive concept has mainly been described above with reference to a few embodiments. However, as is readily appreciated by a person skilled in the art, other embodiments than the ones disclosed above are equally possible within the scope of aspects of the inventive concept, as defined by the appended patent claims or by the items in the embodiment section below.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. Reference to one, two or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIG. 1a illustrates in a perspective view an embodiment of panels in a locked state.

FIG. 1b illustrates in a cross-sectional side view the panels in FIG. 1a along the section A-A in an unlocked state of the panels, without a separate tongue.

FIG. 1c illustrates a cross-sectional side view of the panels in FIG. 1a along the section A-A zoomed in around the first and second edge portions.

FIG. 1d illustrates a perspective view of the panels in FIG. 1a in an unlocked state, whereby the second surface portions may be seen.

FIGS. 5a-5c illustrate embodiments of panels in a locked state in cross-sectional side views and in a side view (FIG. 5b).

FIGS. 5d-5e illustrate embodiments of the panels in FIGS. 5a-5c in an unlocked state in a top view (FIG. 5d) and in a bottom view (FIG. 5e)

FIG. 5f illustrates an embodiment of panels in a locked state in a cross-sectional side view.

FIG. 5g illustrates an embodiment of a separate tongue in a cross-sectional top view and in a cross-sectional side view.

DETAILED DESCRIPTION

Next, various embodiments of building panels comprising a first 1 and a second 2 building panel will be described with reference to the embodiments in FIGS. 1a-1d, 2a-2c, 3a-3d, 4a-4b and 5a-5g. In non-limiting embodiments, the panels may be furniture components, wall components or cubicle components, such as components for a shower cubicle or for a toilet stall. Generally herein, there may be plural building panels, even though focus will be on describing the first 1 and second 2 panels.

Figure 3A:
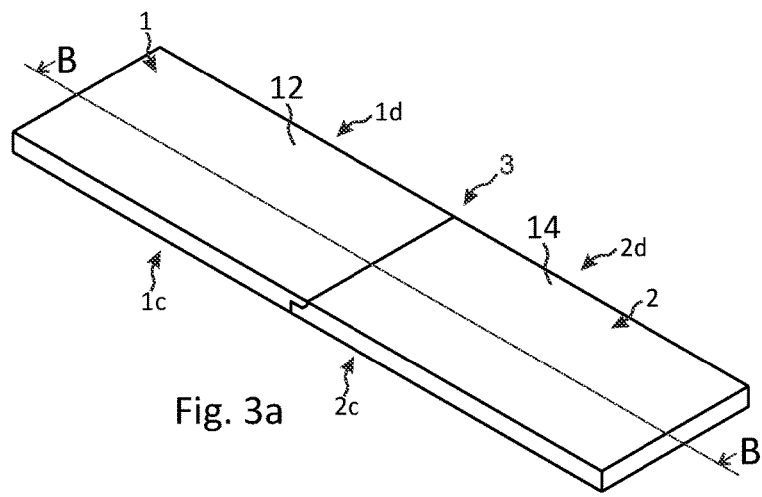
FIG. 3a illustrates in a perspective view an embodiment of panels in a locked state.
Figure 3B:
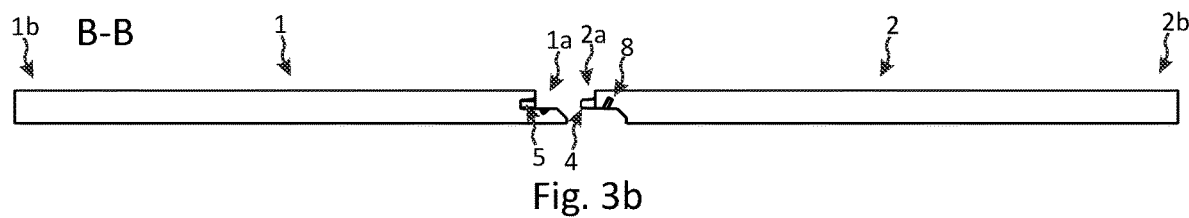
FIG. 3b illustrates in a cross-sectional side view the panels in FIG. 3a along the section B-B in an unlocked state of the panels, without a separate tongue.
Figure 3C:
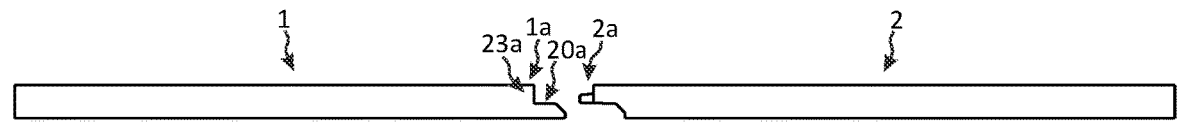
FIG. 3c illustrates the panels in FIG. 3a in a side view in an unlocked state.

Each panel 1, 2 may comprise an edge portion 1a, 2a, an opposite edge portion 1b, 2b and a pair of opposite side edge portions 1c, 1d, 2c, 2d, see, e.g., FIGS. 1a and 3a. The first panel 1 may comprise a first 11 and a second 12 surface portion and the second panel 2 may comprise a first 13 and a second 14 surface portion, cf. FIG. 1b. Preferably, the panels have a substantially uniform thickness. When installed in a wet area, the second surface portions 12, 14 preferably face a region adapted to be wet or moist in an installed state of the building panels comprising the panels 1, 2.

The panels comprise a locking device 3, preferably a mechanical locking device, which comprises a tongue 4 and an edge groove 5 provided in a second edge portion 2a of the second panel and a first edge portion 1a of the first panel, respectively. The locking device 3 further comprises a separate, preferably flexible, tongue 6 and a tongue groove 7. The separate tongue 6 may comprise a polymer material and, preferably, a reinforcement, such as glass fibres. The tongue groove 7 may be provided in the first edge portion 1a as shown in, e.g., FIGS. 1b-1d, 2c, 3b, 3d, 4a-4b and 5f or in the second edge portion 2a as shown in, e.g., FIGS. 5a-5e.

The separate tongue is provided in an insertion groove 8 which may be provided in the second edge portion 2a as shown in, e.g., FIGS. 1b-1d, 2c, 3b, 3d, 4a-4b and 5f or in the first edge portion 1a as shown in, e.g., FIGS. 5a-5e. The insertion groove 8 may comprise a first internal wall 8a, and preferably a second, opposite, internal wall 8b. Preferably, the separate tongue is displaceably inserted in the insertion groove. During locking, the separate tongue 6 may be displaced into the insertion groove 8 and thereafter out of the insertion groove into the tongue groove 7. The separate tongue may be displaced into the insertion groove by cooperation, such as engagement, between the separate tongue and the first edge portion 1a, such as the first lip 15 (introduced below), or the second edge portion 2a. The separate tongue may comprise two opposite displacement surfaces 6a, 6b, one or both of which may be displaceable against the, preferably, parallel, internal wall(s) 8a, 8b during locking, cf. FIG. 5g.

As illustrated in, e.g., FIGS. 1b-1c, 3b and 3d, a major portion of the insertion groove 8, such as the entire insertion groove, along a thickness direction TD of the panels 1, 2 may be provided in an upper half UH of the second panel 2. Preferably, the thickness direction TD of the panels is parallel to the direction D1 introduced below. In some embodiments, and as illustrated in, e.g., FIG. 5c, a major portion of the insertion groove 8, such as at least 50%, or at least 75%, or at least 90%, or the entire insertion groove, along the thickness direction TD of the panels may be provided in a lower half LH of the first panel 1. Above, a major portion may amount to more than 50%.

In some embodiments herein, such as in FIGS. 1a-1d, 2a-2c, 3a-3d, 4a-4b and 5a-5f, and as illustrated in FIG. 5g, the separate tongue 6 may comprise flexible protrusions 6c that are bendable in a transverse direction T of the separate tongue 6 and that may displace the separate tongue in the insertion groove 8 during locking, which for example may be a snap action. For example, the displacement may be caused by virtue of a biasing force of the flexible protrusions 6c. The separate tongue 6 in FIG. 5g may be referred to as a bristle tongue, which preferably is formed by injection moulding.

In some embodiments, and as shown in and/or being applicable to, e.g., FIGS. 1a-1d, 2a-2c, 3a-3d, 4a-4b and 5f, a length LG of the tongue groove 7 along the first edge portion 1a is smaller than a length L1 of the first edge portion 1a. For example, the length LG may be smaller, but within 80% or more of the length L1, such as within 90%. Alternatively, or additionally, a length LN of the insertion groove 8 along the second edge portion 2a is smaller than a length L2 of the second edge portion 2a. For example, the length LN may be smaller, but within 80% or more of the length L2, such as within 90%.

In some embodiments, and as shown in and/or being applicable to, e.g., FIGS. 5a-5e, a length LG of the tongue groove 7 along the second edge portion 2a is smaller than the length L2 of the second edge portion 2a. For example, the length LG may be smaller, but within 80% or more of the length L2, such as within 90%. Alternatively, or additionally, a length LN of the insertion groove 8 along the first edge portion 1a is smaller than the length L1 of the first edge portion 1a. For example, the length LN may be smaller, but within 80% or more of the length L1, such as within 90%.

Figure 2A:
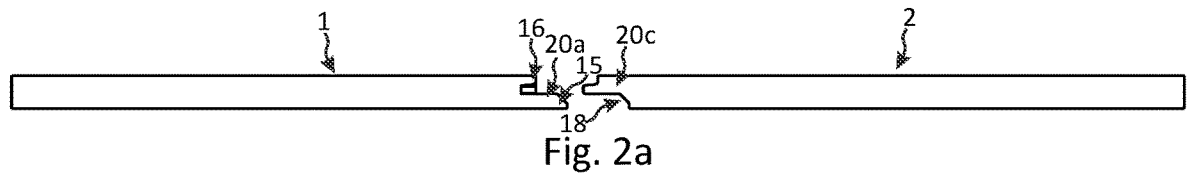
FIG. 2a illustrates the panels in FIG. 1a in a side view in an unlocked state.
Figure 2B:
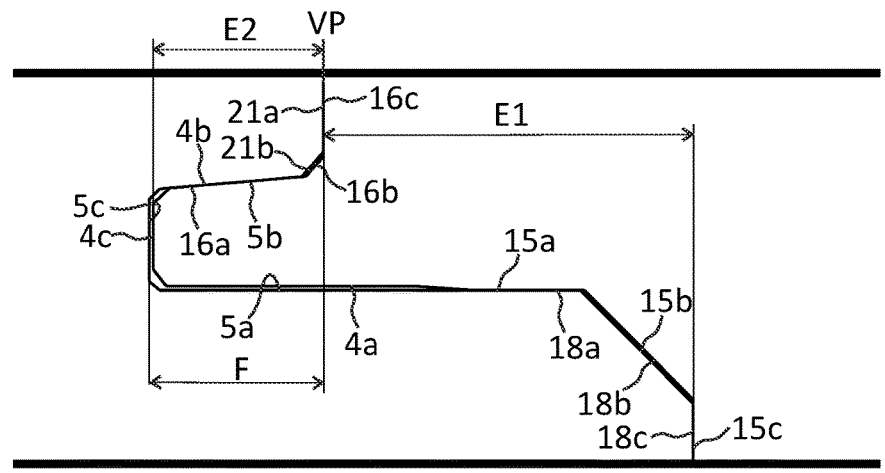
FIG. 2b illustrates a side view of the locked panels in FIG. 1a zoomed in around the first and second edge portions.
Figure 2C:
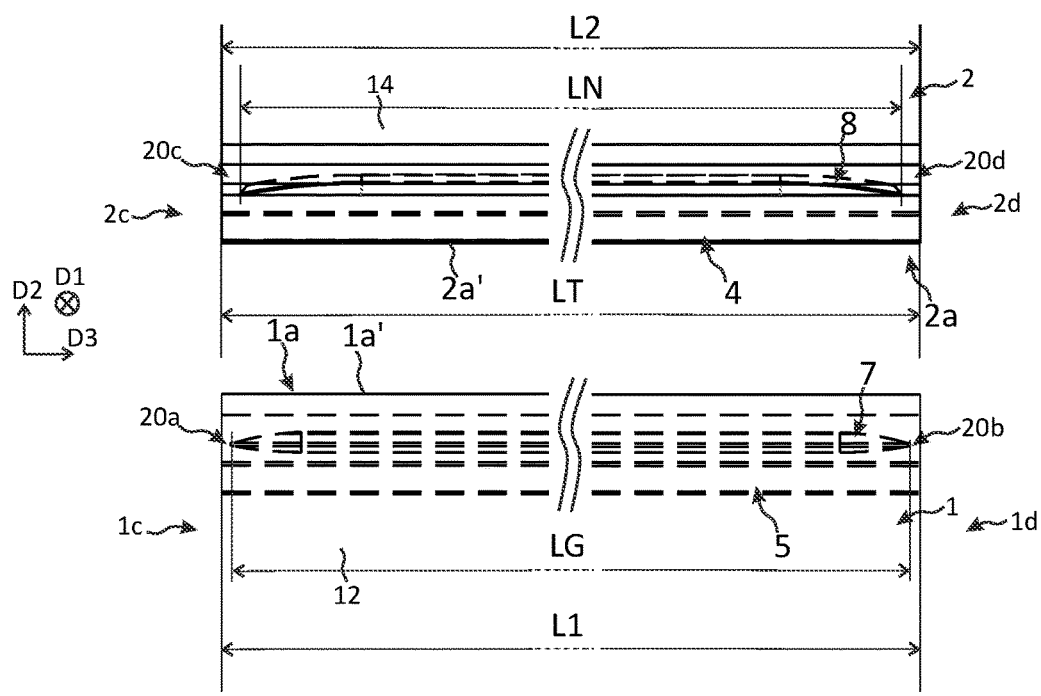
FIG. 2c illustrates a bottom view of the panels in FIG. 1a zoomed in around the first and second edge portions.
Figure 4A:
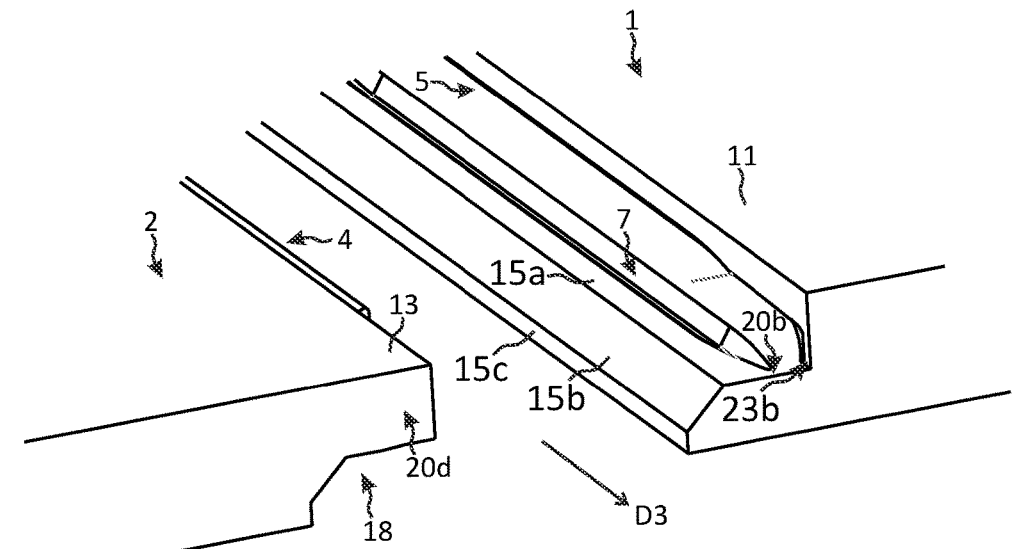
FIG. 4a illustrates a perspective view of the panels in FIG. 3a in an unlocked state, whereby the first surface portions may be seen.
Figure 4B:
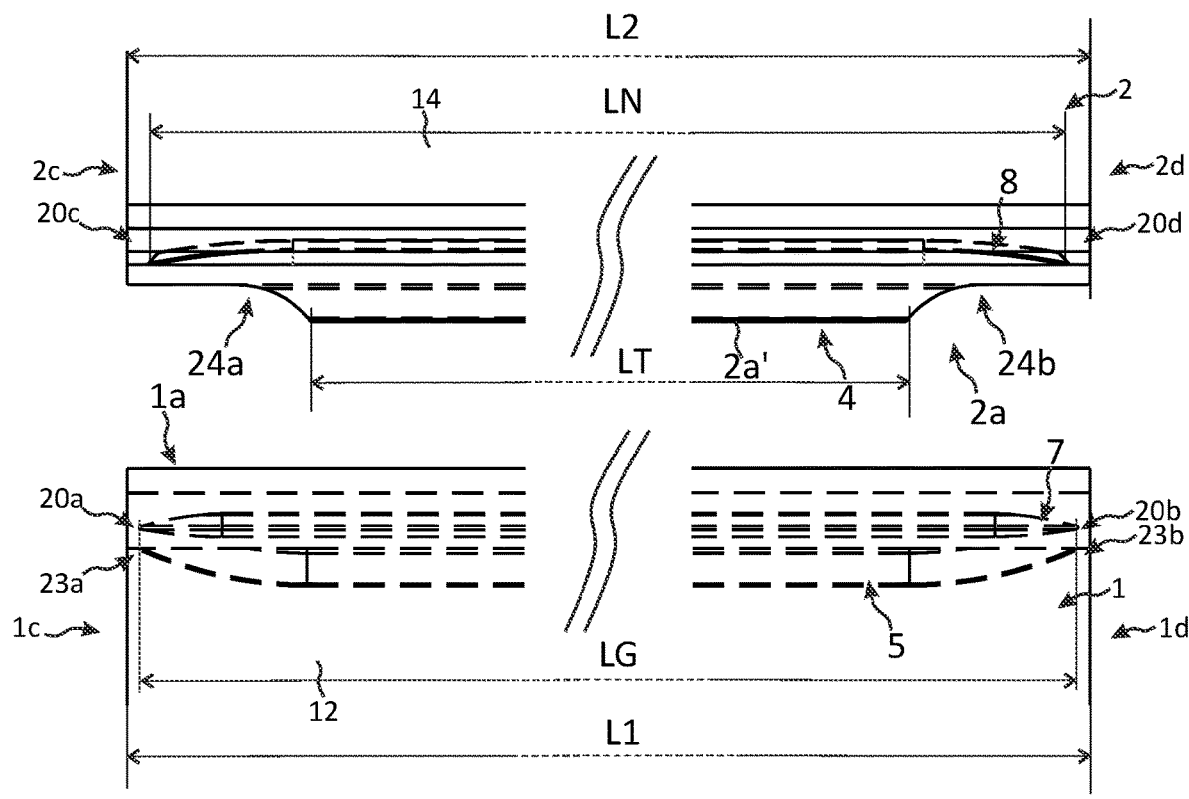
FIG. 4b illustrates a bottom view of the panels in FIG. 3a zoomed in around the first and second edge portions.

The length L1 (L2) may be a length between two opposite side edge portions 1c, 1d (2c, 2d) of the first panel 1 (second panel 2), preferably, at or adjacent to an outermost portion 1a' of the first edge portion (an outermost portion 2a' of the second edge portion), see, e.g., FIGS. 2c and 4b. The lengths L1 and L2 may be maximal lengths along the first and second edge portions, respectively.

Preferably, the tongue groove 7 is delimited by a first 20a and/or a second 20b wall portion along a longitudinal direction of the tongue groove 7, see, e.g., FIGS. 2a-2c, 3c-3d, 4a-4b and 5a-5e. Preferably, the first 20a and/or second 20b wall portion is located at or adjacent to the side edge portion(s) 1c and/or 1d (alternatively 2c and/or 2d). Alternatively, or additionally, the insertion groove 8 preferably is delimited by a first 20c and/or a second 20d barrier portion along a longitudinal direction of the insertion groove 8. Preferably, the first 20c and/or second 20d barrier portion is located at or adjacent to the side edge portion(s) 2c and/or 2d (alternatively 1c and/or 1d). Thereby, the tongue groove 7 and/or insertion groove 8 may be concealed from some or all of the side edge portions 1c, 2c, 1d, 2d, see, e.g., FIGS. 1a, 1d, 2a-2c, 3a, 3c-3d, 4a-4b, 5b, 5d and 5e. It is clear that the embodiments in FIGS. 5a, 5c and 5f may be cross-sectional side views of the panels being displaced from the wall portion(s) 20a, 20b and the barrier portions(s) 20c, 20d, such as along a section A-A or B-B, cf. FIGS. 1a and 3a. Thereby, the tongue groove 7 and/or the insertion groove 8 in any of FIGS. 5a, 5c and 5f may be delimited by wall portion(s) 20a, 20b and/or barrier portion(s) 20c, 20d as shown in, e.g., FIGS. 1d, 2a, 2c, 3c-3d, 4a-4b, 5b, 5d and 5e. In any embodiment herein, and as shown in, e.g., FIGS. 2c and 4b, the tongue groove 7 and/or the insertion groove 8 may be tapering towards its end(s), such along the D1 and/or D2 direction(s) introduced below. The tongue groove 7 and/or the insertion groove 8 may be formed by jumping, preferably rotating, cutting tools.

The tongue 4 and the edge groove 5 are configured to cooperate, preferably engage, with each other for locking the first 1a and the second 2a edge portions in a first direction D1. The tongue may be inserted into the edge groove. Moreover, the separate tongue 6 and the tongue groove 7 are configured to cooperate, preferably engage, with each other for locking the first 1a and second 2a edge portions in a second direction D2.

The first direction D1 may be a direction which is essentially perpendicular to a main plane M1 provided along the first surface portion 11 and/or to a main plane M2 provided along the second surface portion 13. The second direction D2 may be a direction which is essentially perpendicular to a vertical plane VP provided between first joining portions 22a, 22b of the first and the second panel. The vertical plane may be provided perpendicularly to the main plane M1, M2 of the first and/or second panel. Thereby, the second direction D2 may be essentially parallel with the first and/or the second surface portion of the first and/or the second panel. A third direction D3 may be perpendicular to both the first D1 and second D2 directions. The first 1a and second 2a edge portions may extend along the direction D3.

The panels 1, 2 may be configured to be arranged in parallel with each other in a locked state of the panels, preferably such that their main planes M1, M2 are essentially provided in parallel. Preferably, the panels 1, 2 are configured to be locked by a relative displacement with respect to each other while the main planes M1, M2 are essentially provided in parallel.

In the locked state, a longitudinal extension LE of the separate tongue 6 may extend along the direction D3. Moreover, the tongue 4, the edge groove 5, the tongue groove 7 and the insertion groove 8 may extend longitudinally along the direction D3. Thereby, each length LG, LN, L1 and L2, as well as a length LT of the tongue 4 along the second edge portion 2a, may be a length along the direction D3.

In some embodiments, and as shown in, e.g., FIGS. 1a-1d, 2a-2c and 5e, the length LG may be smaller than the length LT, preferably at or adjacent to the outermost portion 2a'. The tongue 4 may extend along the entire second edge portion 2a. Moreover, the edge groove 5 may extend along the entire first edge portion 1a.

In some embodiments, and as shown in, e.g., FIGS. 3a-3d, 4a-4b and 5e (broken line), the length LG may be larger than the length LT, preferably at or adjacent to the outermost portion 2a'. The tongue 4 may extend along a portion of the second edge portion 2a. For example, cavities 24a, 24b may be provided on either side of the tongue 4, preferably along the direction D3. Moreover, the edge groove 5 may extend along a portion of the first edge portion 1a. For example, the edge groove 5 may be delimited by a first 23a and/or a second 23b peripheral wall portion along the longitudinal direction of the edge groove, see, e.g., FIGS. 3c-3d, 4a-4b and 5d (broken line).

As shown in, e.g., FIGS. 2c, 5d and 5e (unbroken line), LN may be smaller than LT. Moreover, as shown in, e.g., FIGS. 4b, 5d and 5e (broken line), LT may be smaller than LN.

The first panel 1 may comprise a first 15 and a second 16 lip, see, e.g., FIGS. 2a and 5c. The edge groove 5 may be provided between the first 15 and second 16 lips. Preferably, the first lip 15 extends beyond the second lip 16 along the direction D2. An extension E2 of the tongue 4 from the vertical plane VP may be essentially the same or preferably smaller than an extension F of the second lip 16 from an innermost portion of the edge groove 5 to the vertical plane VP. For example, an extension E1 of the first lip 15 along the direction D2 from the vertical plane VP may be larger than, such as at least 1.5 times or at least two 2 times, the extension E2 of the tongue 4 from the vertical plane VP, see, e.g., the embodiments in FIGS. 1a-1d, 2a-2c, 3a-3d, 4a-4b and 5a-5e.

The first lip 15 may comprise an inner lip wall 15a and an outer lip wall 15c and, optionally, an intermediate lip wall 15b provided therebetween. Preferably, at least a portion of the inner lip wall 15a, such as the entire, is parallel with the main plane M1. The tongue groove 7 may be provided in the inner lip wall 15a as shown in, e.g., FIGS. 1b-1d, 2c, 3b, 3d, 4a-4b and 5f. In some embodiments, the insertion groove 8 may be provided in the inner lip wall 15a as shown in, e.g., FIGS. 5a-5e. The intermediate lip wall 15b preferably is inclined or curved. The incline may be 10°-60°, preferably 15°-45°, such as with respect to M1 and/or M2. Thereby, the intermediate lip wall 15b may provide a guiding surface for guiding the separate tongue 6 during assembly. The second lip 16 may comprise an inner lip wall 16a and an outer lip wall 16c and, optionally, an intermediate lip wall 16b provided therebetween. The intermediate lip wall 16b preferably is inclined or curved. The incline may be 10°-60°, preferably 15°-45°, such as with respect to M1 and/or M2. Preferably, the outer lip wall(s) 15c and/or 16c extend(s) essentially perpendicularly to M1, such as along the direction D1.

Figure 3D:
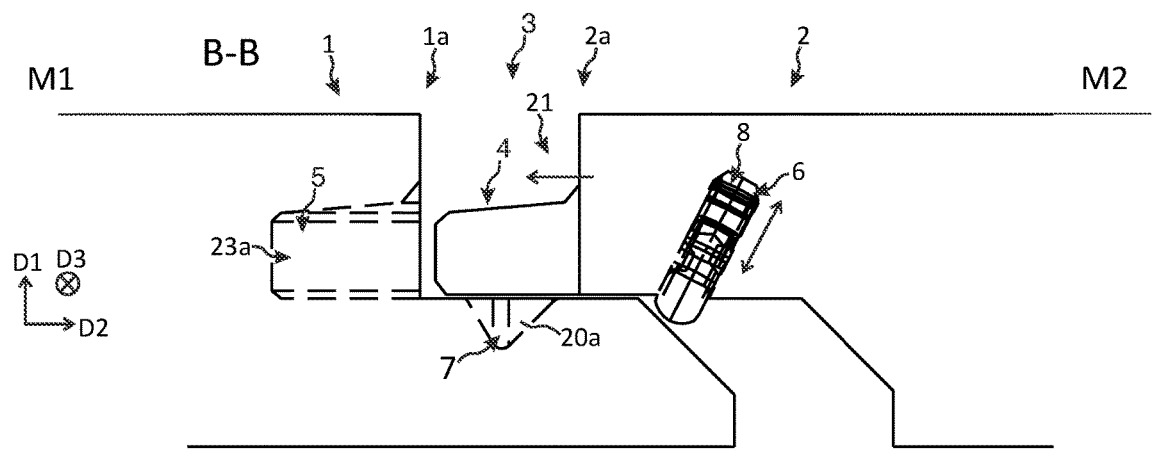
FIG. 3d illustrates a cross-sectional side view of the panels in FIG. 3a along the section B-B in an unlocked state of the panels zoomed in around the first and second edge portions.

The locking device 3 may be configured such that when the first 1 and second panels 2 are arranged with their main planes M1, M2 in parallel, and the tongue 4 and the edge groove 5 are displaced horizontally towards each other, the separate tongue 6 engages with the first lip 15, such as with the intermediate lip wall 15*b* and/or the inner lip wall 15*a*, for displacing the separate tongue 6 into the insertion groove 8, cf. FIG. 3*d*.

Opposite first 5*a* and second 5*b* groove walls of the edge groove 5 may be provided by at least a section of the inner lip walls 15*a* and 16*a*, respectively. The edge groove may further comprise a bottom wall 5*c*, preferably joining the groove walls 5*a*, 5*b*. The second groove wall 5*b* and/or the second tongue wall 4*b* of the tongue introduced below may be slanted, such as by 1°-20°, preferably 5°-10°, such as with respect to M1 and/or M2. Thereby, the guiding of the tongue 4 into the edge groove may be improved.

The second panel 2 may comprise a first recess 18 provided between the second surface portion 14 and the tongue 4, preferably a tip wall 4*c* of the tongue, cf., FIG. 2*a*. The first recess may comprise an inner recess wall 18*a* and an outer recess wall 18*c* and, optionally, an intermediate recess wall 18*b* provided therebetween. The insertion groove 8 may be provided in a wall of the first recess 18, such as in the inner recess wall 18*a*, as shown in, e.g., FIGS. 1*b*-1*d*, 2*c*, 3*b*, 3*d*, 4*b* and 5*f*. In some embodiments, the tongue groove 7 may be provided in a wall of the first recess 18, such as the inner recess wall 18*a*, as shown in, e.g., FIGS. 5*a*-5*e*. The second panel 2 may comprise a second recess 21 provided between the first surface portion 13 and the tongue 4, preferably the tip wall 4*c*, see, e.g., FIG. 3*d*.

The tongue 4 may comprise a first 4*a* and a second 4*b*, oppositely arranged, tongue wall and, optionally, the tip wall 4*c*. The first 4*a* and the second 4*b* tongue walls may be provided by at least a section of the second 21 and first 18 recesses, respectively.

The first lip 15 may be provided in the first recess 18 in the locked state. The lip walls 15*a* and 15*c* may be configured to face the recess walls 18*a* and 18*c*, respectively, in the locked state.

The panels may be further locked along the D2 direction. As shown in, e.g., FIGS. 1*c*, 2*b*, 5*a*-5*c* and 5*f* in a locked state of the panels, the locking device 3 may further comprise the first joining portions 22*a*, 22*b*. The first joining portions may be provided in the edge portions 1*a*, 2*a* adjacent to the first surface portions 11, 13. The first joining portion 22*a* of the first panel 1 may be provided in the outer lip wall 16*c*. The first joining portion 22*b* of the second panel 2 may be provided in an outer recess wall 21*a* of the second recess 21.

Alternatively, or preferably additionally, and as shown in, e.g., FIGS. 1*c*, 2*b*, 5*a*-5*c* and 5*f* in a locked state of the panels, the locking device 3 may further comprise second joining portions 17*a*, 17*b*. The second joining portions may be provided in the edge portions 1*a*, 2*a* adjacent to the second surface portions 12, 14. The second joining portion 17*a* of the first panel 1 may be provided in the outer lip wall 15*c*. The second joining portion 17*b* of the second panel 2 may be provided in the outer recess wall 18*c*.

Thus, the first and second edge portions may engage with each other at the first joining portions and/or at the second joining portions in the locked state for providing locking along the direction D2.

The panels may be further locked along the direction D1. As shown in, e.g., FIGS. 1*c*, 2*b*, 5*a*-5*c* and 5*f* in a locked state of the panels, the locking device 3 may further comprise first engagement portions 9*a*, 9*b*. The first engagement portion 9*a* of the first panel 1 may be provided in the inner lip wall 15*a*, such as inside the outer lip wall 15*c* and preferably inside the intermediate lip wall 15*b* along the direction D2. The first engagement portion 9*a* of the first panel 1 may be provided outside of the tongue groove 7 (insertion groove 8) along the direction D2, see, e.g., FIG. 1*c* (FIG. 5*c*). The first engagement portion 9*b* of the second panel 2 may be provided in a wall of the first recess 18, such as the inner recess wall 18*a*. The first engagement portion 9*b* may be provided inside of the insertion groove 8 (tongue groove 7) along the direction D2.

Alternatively, or preferably additionally, and as shown in, e.g., FIGS. 1*c*, 2*b*, 5*a*-5*c* and 5*f* in a locked state of the panels, the locking device 3 may further comprise second engagement portions 10*a*, 10*b*. The second engagement portion 10*a* of the first panel 1 may be provided in the inner lip wall 16*a*, which preferably is inclined. The second engagement portion 10*b* of the second panel 2 may be provided in the second tongue wall 4*b*. The second engagement portions 10*a*, 10*b* may be at least partially, preferably completely, planar.

At least one of, preferably all of, the tongue 4, the edge groove 5, the first engagement portions 9*a*, 9*b* and the second engagement portions 10*a*, 10*b* may provide locking along the direction D1.

In any embodiment herein, such as in any of FIGS. 1*a*-1*d*, 2*a*-2*c*, 3*a*-3*d*, 4*a*-4*b* and 5*a*-5*c*, there may be at least one space S1, S2, S3, S4 between portions of the panels 1, 2 in the locked state, such as between the tongue 4 and the edge groove 5 and/or between the first lip 15 and the second panel 2. As shown in, e.g., FIGS. 1*c*, 2*b* and 5*c* there may be a space S1 between the first tongue wall 4*a* and the first groove wall 5*a*, preferably being disposed inside of the tongue groove 7 along the direction D2. For example, the space S1 may extend above the inner lip wall 15*a* between the bottom wall 5*c* and the tongue groove 7. Alternatively, or additionally, as shown in, e.g., FIGS. 1*c*, 2*b* and 5*c*, there may be a space S2 between the first lip 15 and the first recess 18, such as between the intermediate lip wall 15*b* and the intermediate recess wall 18*b*. For example, the space S2 may extend between the first engagement portions 9*a*, 9*b* and the second joining portions 17*a*, 17*b*. Optionally, there may be a space S3 between the tongue 4 and the edge groove 5, such as between the tip wall 4*c* and the bottom wall 5*c* and/or there may be a space S4 between the intermediate lip wall 16*b* and an intermediate wall 21*b* provided between second tongue wall 4*b* and the outer recess wall 21*a*, see, e.g., FIGS. 1*c*, 2*b* and 5*c*.

In some embodiments, an adhesive may be provided in the at least one space S1, S2, S3, S4 for further improving the seal, preferably in the space S2.

It is noted that in some embodiments, and as shown in FIG. 5*f*, the tongue 4 may cooperate with the edge groove 5 such that there is substantially no space S1 and/or no space S2.

Generally herein, such as in FIGS. 1*a*-1*d*, 2*a*-2*c*, 3*a*-3*d*, 4*a*-4*b* and 5*a*-5*f*, the tongue groove 7 and/or the insertion groove 8 may be slanted relative the main plane(s) M1 and/or M2. In a first example, a locking surface 7*a* configured to engage with the separate tongue 6 in the locked state may be slanted by an angle a1, cf., FIG. 1*c*. In a second example, the first internal wall 8*a*, and preferably the second, opposite, internal wall 8*b*, of the insertion groove may be slanted by an angle a2. Any of both of the angles a1, a2 may be 20°-70°, preferably 40-65°. The locking surface 7*a* and/or the internal wall(s) 8*a*, 8*b* may be planar.

Generally herein, the panels 1, 2 may be configured to be provided in an upright position in the locked state. Thereby, the main planes M1, M2 of the first and second panels may be provided essentially perpendicularly to a support member, such as a floor or a subfloor, on which the installed panels 1, 2 are configured to be arranged or above which the installed panels 1, 2 are configured to be positioned. For example, this may be suitable when the panels are furniture components, wall components or cubicle components, such as components for a shower cubicle. In addition, or as an alternative, however, it is equally conceivable that the panels 1, 2 may be configured to be provided in a horizontal position in the locked state such that the main planes M1, M2 may be provided essentially in parallel with the support member.

The inventive concept has mainly been described above with reference to a few embodiments. However, as is readily appreciated by a person skilled in the art, other embodiments than the ones disclosed above are equally possible within the scope of the inventive concept, as defined by the appended patent claims, the embodiment section and the summary. For example, it is clear that embodiments and examples described herein of the first 9a, 9b and/or second 10a, 10b engagement portions, first 22a, 22b and/or second 17a, 17b joining portions, lips 15, 16, recesses 18, 21, spaces S1, S2, S3, S4 also are conceivable in other embodiments and examples, such as for those described in relation to FIGS. 3a-3d and 4a-4b shown in unlocked states. In addition, in some exemplary embodiments, FIGS. 1a-1d, 2a-2c, 3a-3d, 4a-4b and 5a-5f may represent drawings that are drawn to scale.

Embodiments

Item 1. Building panels comprising a first panel (1) and a second panel (2) and comprising a locking device (3), the locking device comprising:
- a tongue (4) and an edge groove (5) provided in the second panel (2) and the first panel (1), respectively, the tongue and the edge groove being configured to cooperate with each other for locking a first edge portion (1a) of the first panel to a second edge portion (2a) of the second panel in a first direction (D1), and
- a separate, preferably flexible, tongue (6) and a tongue groove (7) configured to cooperate with each other for locking said first edge portion (1a) to said second edge portion (2a) in a second direction (D2), the separate tongue being provided in an insertion groove (8),
- wherein a length (LG) of the tongue groove (7) along the first (1a) or second (2a) edge portion is smaller than a length (L1; L2) of the first (1a) or second (2a) edge portion, respectively, and/or
- wherein a length (LN) of the insertion groove (8) along the second (2a) or first (1a) edge portion is smaller than the length (L1; L2) of the second (2a) or first (1a) edge portion, respectively.

Item 2. Building panels according to item 1, wherein the first panel (1) comprises a first (15) and a second (16) lip, the first lip (15) preferably extending beyond the second lip (16) along the second direction (D2), and wherein the edge groove (5) is provided between the first (15) and second (16) lips.

Item 3. Building panels according to item 2, wherein the tongue groove (7) is provided in the first lip (15), such as in an inner lip wall (15a) thereof.

Item 4. Building panels according to any of the preceding items, wherein the tongue (4) and the edge groove (5) are provided in the second edge portion (2a) and the first edge portion (1a), respectively.

Item 5. Building panels according to any of the preceding items, wherein the tongue groove (7) is delimited by a first (20a) and/or a second (20b) wall portion along a longitudinal direction of the tongue groove (7), and/or wherein the insertion groove (8) is delimited by a first (20c) and/or a second (20d) barrier portion along a longitudinal direction of the insertion groove (8).

Item 6. Building panels according to any of the preceding items, wherein the insertion groove (8) and the tongue groove (7) are provided in the second edge portion (2a) and the first edge portion (1a), respectively.

Item 7. Building panels according to any of the preceding items, wherein the length (LG) of the tongue groove (7) is smaller than a length (LT) of said tongue (4) along the second edge portion (2a).

Item 8. Building panels according to any of the preceding items 1-6, wherein the length (LG) of the tongue groove (7) is larger than a length (LT) of said tongue (4) along the second edge portion (2a).

Item 9. Building panels according to any of the preceding items, wherein the first (1) and second (2) panels are configured to be locked by a relative displacement with respect to each other while main planes (M1; M2) of the first and second panels are essentially provided in parallel.

Item 10. Building panels according to any of the preceding items, wherein the building panels, such as the first and second panels, are configured to be arranged in parallel with each other in a locked state of the first (1) and second (2) panels.

Item 11. Building panels according to any of the preceding items, wherein the tongue groove (7) and/or the insertion groove (8) are/is slanted relative a main plane (M1; M2) of the first panel and/or the second panel.

Item 12. Building panels according to any of the preceding items, wherein, in a locked state of the first (1) and second (2) panels, there is
- a space (S1; S3; S4) between the tongue (4) and the edge groove (5), such as between a first tongue wall (4a) of the tongue and a first groove wall (5a) of the edge groove, and/or
- a space (S2) between a first lip (15) of the first panel (1) and the second panel (2), such as a first recess (18) of the second panel.

Item 13. Building panels according to any of the preceding items, wherein the locking device (3) further comprises first engagement portions (9a; 9b) and/or second engagement portions (10a; 10b) for locking along the first direction (D1).

Item 14. Building panels according to any of the preceding items, wherein the locking device (3) further comprises first joining portions (22a; 22b) and/or second joining portions (17a; 17b) for locking along the second direction (D2).

Item 15. Building panels according to any of the preceding items, wherein the building panels are furniture components, wall components or cubicle components, such as components for a shower cubicle.

The invention claimed is:

1. Building panels comprising a first panel and a second panel and comprising a locking device, the building panels being configured to be arranged in parallel with each other in a locked state of the first and second panels and the locking device comprising:
- a tongue and an edge groove provided in the second panel and the first panel, respectively, the tongue and the edge groove being configured to cooperate with each other for locking a first edge portion of the first panel to a second edge portion of the second panel in a first direction, and
- a separate tongue and a tongue groove configured to cooperate with each other for locking said first edge portion to said second edge portion in a second direction, the separate tongue being provided in an insertion groove, wherein:
a length of the tongue groove along the first or second edge portion is smaller than a length of the first or second edge portion, respectively, the tongue groove being delimited by opposing first and second wall portions along a longitudinal direction of the tongue groove; and/or
a length of the insertion groove along the second or first edge portion is smaller than the length of the second or first edge portion, respectively, the insertion groove being delimited by opposing first and second barrier portions along a longitudinal direction of the insertion groove.

2. Building panels according to claim 1, wherein the tongue and the edge groove are provided in the second edge portion and the first edge portion, respectively.

3. Building panels according to claim 1, wherein the insertion groove and the tongue groove are provided in the second edge portion and the first edge portion, respectively.

4. Building panels according to claim 1, wherein the length of the tongue groove is smaller than a length of said tongue along the second edge portion.

5. Building panels according to claim 1, wherein the length of the tongue groove is larger than a length of said tongue along the second edge portion.

6. Building panels according to claim 1, wherein the first and second panels are configured to be locked by a relative displacement with respect to each other while main planes of the first and second panels are essentially provided in parallel.

7. Building panels according to claim 1, wherein the tongue groove and/or the insertion groove are/is slanted relative a main plane of the first panel and/or the second panel.

8. Building panels according to claim 1, wherein, in a locked state of the first and second panels, there is a space between the tongue and the edge groove, and/or a space between a first lip of the first panel and the second panel.

9. Building panels according to claim 1, wherein the locking device further comprises first engagement portions and/or second engagement portions for locking along the first direction.

10. Building panels according to claim 1, wherein the locking device further comprises first engagement portions and second engagement portions for locking along the first direction.

11. Building panels according to claim 1, wherein the locking device further comprises first joining portions and/or second joining portions for locking along the second direction.

12. Building panels according to claim 1, wherein the locking device further comprises first joining portions and second joining portions for locking along the second direction.

13. Building panels according to claim 1, wherein the building panels are furniture components, wall components or cubicle components.

14. Building panels according to claim 1, wherein the separate tongue is flexible.

15. Building panels according to claim 1, wherein the length of the tongue groove along the first or second edge portion is smaller than, but within 80% or more, of the length of the first or second edge portion, respectively; and/or
the length of the insertion groove along the second or first edge portion is smaller than, but within 80% or more, of the length of the second or first edge portion, respectively.

16. Building panels according to claim 1, wherein the first and second wall portions are adjacent to side edge portions of the first and second panels; and/or
the first and second barrier portions are adjacent to side edge portions of the first and second panels.

* * * * *